United States Patent
Tsai

(10) Patent No.: US 11,427,274 B2
(45) Date of Patent: Aug. 30, 2022

(54) ANGLE ADJUSTABLE BICYCLE SADDLE

(71) Applicant: Foming Bicycle Parts Co., Ltd., Fuxing Township, Changhua County (TW)

(72) Inventor: Shang-Tsang Tsai, Fuxing Township (TW)

(73) Assignee: Foming Bicycle Parts Co., Ltd., Fuxing Township (TW)

( * ) Notice: Subject to any disclaimer, the term of this patent is extended or adjusted under 35 U.S.C. 154(b) by 94 days.

(21) Appl. No.: 16/985,621

(22) Filed: Aug. 5, 2020

(65) Prior Publication Data

US 2022/0041235 A1    Feb. 10, 2022

(51) Int. Cl.
  *B62J 1/08*      (2006.01)
  *F16C 11/10*    (2006.01)

(52) U.S. Cl.
  CPC ............... *B62J 1/08* (2013.01); *F16C 11/103* (2013.01)

(58) Field of Classification Search
  CPC ... B62J 1/08; B62J 1/10; F16C 11/103; F16C 11/10; F16C 11/06
  USPC .................................................. 297/215.15
  See application file for complete search history.

(56) References Cited

U.S. PATENT DOCUMENTS

| | | | | |
|---|---|---|---|---|
| 4,568,121 A * | 2/1986 | Kashima | ..................... | B62J 1/08 297/215.15 |
| 6,702,376 B1 * | 3/2004 | Shen | ......................... | B62J 1/10 248/371 |
| 7,621,595 B1 * | 11/2009 | Chen | ......................... | B62J 1/08 297/215.14 |
| 9,573,642 B2 * | 2/2017 | Liao | ............................ | B62J 1/10 |
| 9,889,898 B1 * | 2/2018 | Marui | ........................ | B62J 1/08 |
| 11,180,212 B2 * | 11/2021 | Shirai | ...................... | F15B 15/16 |
| 2005/0046247 A1 * | 3/2005 | Saccucci | ................... | B62J 1/08 297/215.15 |
| 2007/0040423 A1 * | 2/2007 | Chiang | ...................... | B62J 1/08 297/130 |
| 2011/0241390 A1 * | 10/2011 | Tsai | .......................... | B62J 1/08 297/215.15 |
| 2013/0221713 A1 * | 8/2013 | Pelot | ...................... | B62K 19/36 297/215.13 |
| 2016/0185408 A1 * | 6/2016 | Henderson | ................ | B62J 1/08 297/215.15 |

* cited by examiner

*Primary Examiner* — Mark R Wendell
(74) *Attorney, Agent, or Firm* — Alan D. Kamrath; Karin L. Williams; Mayer & Williams PC

(57) ABSTRACT

An angle adjustable bicycle saddle contains a seat post, a cushion, and a locking unit. The seat post includes an inwardly curved groove having multiple protrusions, and the seat post includes multiple troughs. The cushion includes a body and a cap. The body has a curved holder, an arcuate abutting projection, multiple engagement portions, and multiple through holes corresponding to the multiple troughs. The cap is covered on the curved holder of the body so that the curved holder has a hollow portion. The locking unit includes multiple fixing elements and multiple stepped nuts. A respective fixing element is inserted through a respective trough and a respective through hole. A first end of a respective fixing element is adjustably received in a respective trough, and a second end of the respective fixing element is accommodated in the hollow portion of the curved holder.

3 Claims, 11 Drawing Sheets

ANGLE ADJUSTABLE BICYCLE SADDLE

BACKGROUND OF THE INVENTION

Field of the Invention

The present invention relates to an adjustment structure of a bicycle saddle, and more particularly to an angle adjustable bicycle saddle.

Description of the Prior Art

In the current trend of leisure activities, riding a bicycle to explore mountains, rivers and scenery is one of the most popular leisure activities at present. Therefore, bicycles are no longer just for simple transportation, but are used in entertainment and exercise, thus becoming a popular activity.

To enhance the comfort of riding the bicycle, a cushion of the bicycle saddle is adjustable to a desired position and angle based on riding requirements. When connecting the cushion and a seat post, a first clamp and a second clamp are configured to engage a fixer of the cushion, and at least one screw bolt and nut are applied to fix the seat post and the cushion. Therefore, the seat post under the cushion has to be reinforced, especially for some types of bicycles which are ridden on a bumpy road to avoid fracture removal, and angular change of the cushion and danger. In addition, the bicycle saddle is difficult to adjust.

SUMMARY OF THE INVENTION

The primary object of the present invention is to provide an angle adjustable bicycle saddle which reduces related components, obtains simplification, and connects and easily adjusts a cushion to a desired angle.

To provide the above-mentioned objects, an angle adjustable bicycle saddle provided by the present invention contains: a seat post, a cushion, and a locking unit.

The seat post includes multiple protrusions formed in a tooth shape, and the seat post includes multiple troughs.

The cushion includes multiple engagement portions and multiple through holes. The protrusions of the seat post are engaged with the multiple engagement portions of the cushion, and a respective one of multiple fixing elements of the locking unit is inserted through a respective through hole and a respective trough to screw with or remove from a respective one of multiple stepped nuts, thus fixing or removing the seat post with or from the cushion.

DETAILED DESCRIPTION OF THE PREFERRED EMBODIMENTS

Figure 1:
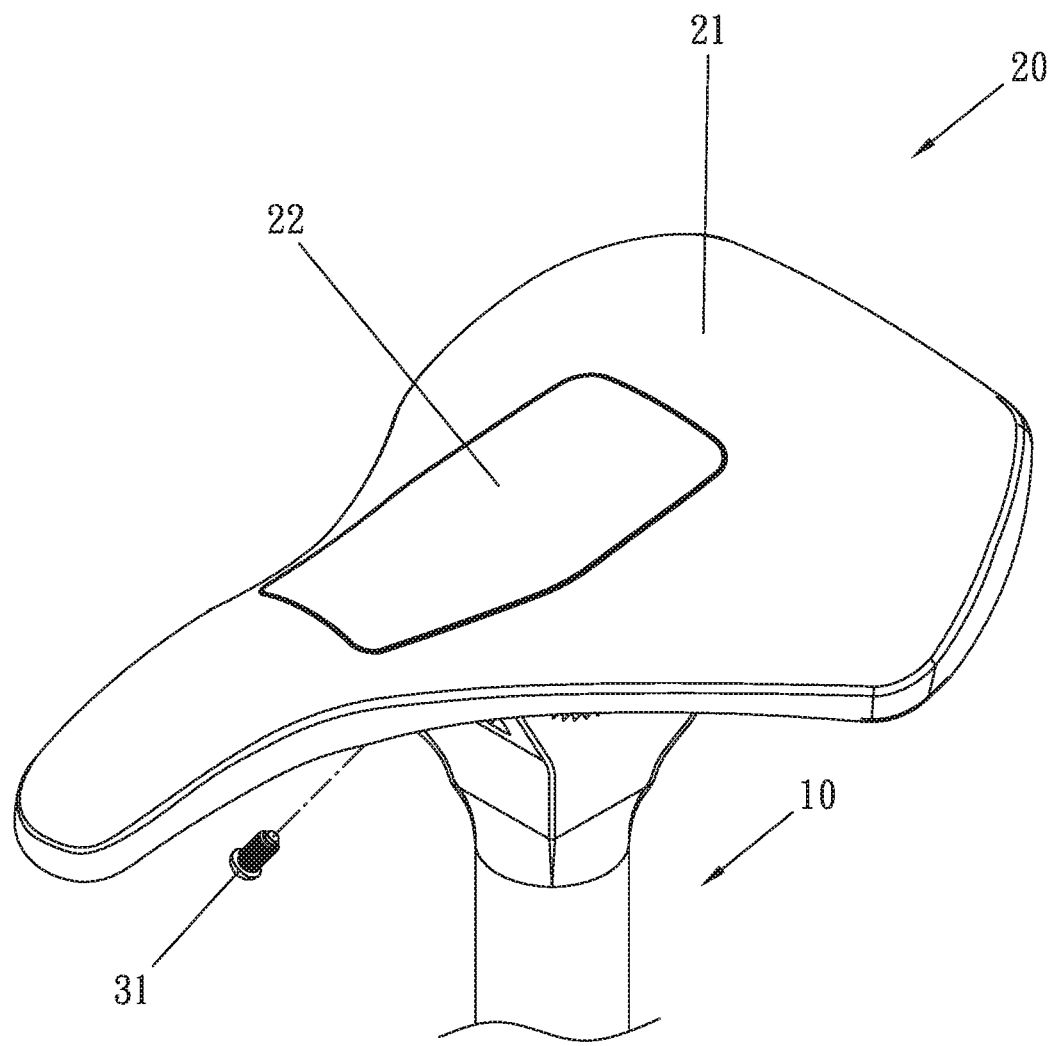
FIG. 1 is a perspective view showing the assembly of an angle adjustable bicycle saddle according to a preferred embodiment of the present invention.
Figure 2:
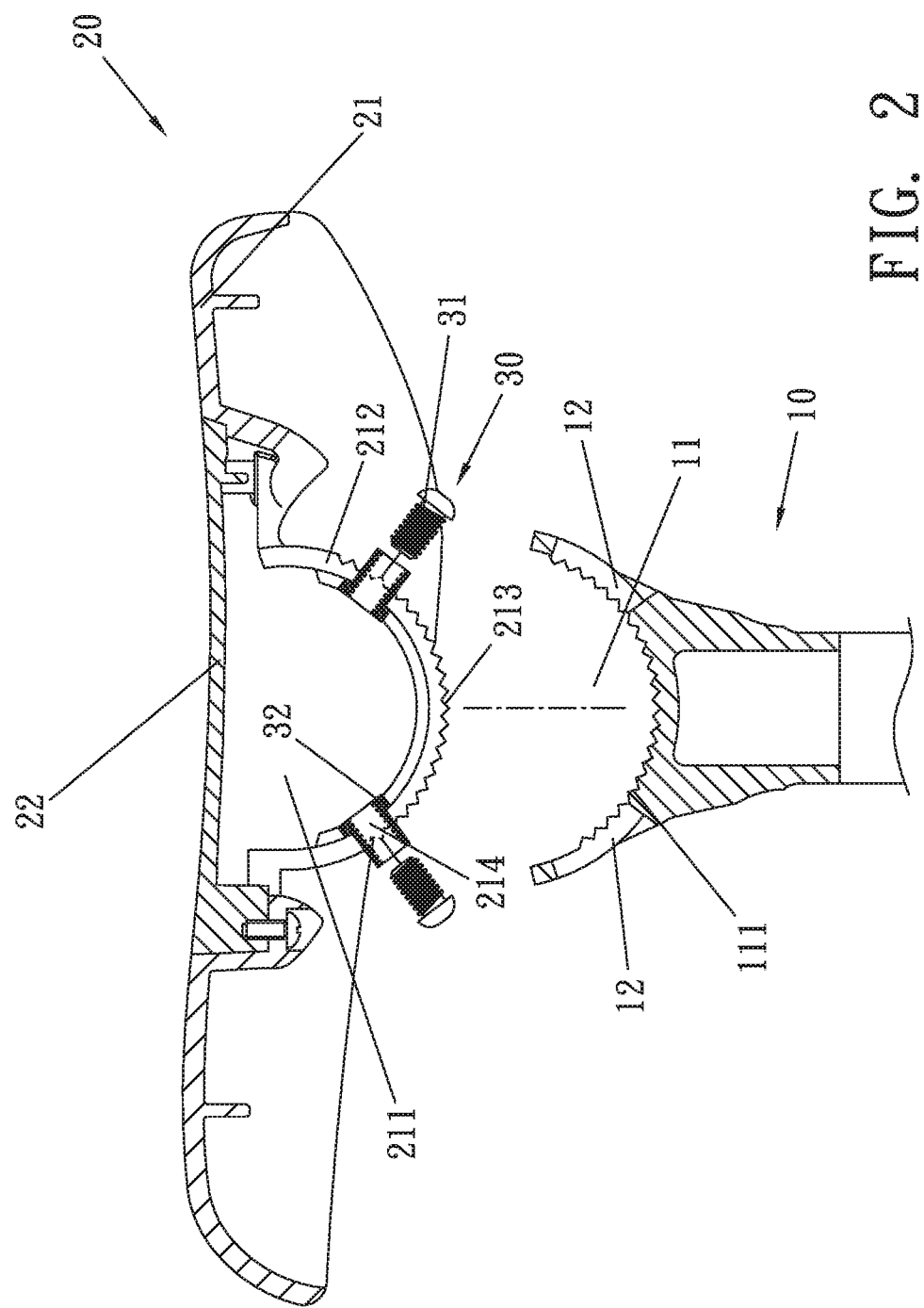
FIG. 2 is a cross sectional view showing the exploded components of the angle adjustable bicycle saddle according to the preferred embodiment of the present invention.

The present invention will be clearer from the following description when viewed together with the accompanying drawings, which show, for purpose of illustrations only, a preferred embodiment in accordance with the present invention.

With reference to FIGS. 1-7, an angle adjustable bicycle saddle according to a preferred embodiment of the present invention comprises:

a seat post 10 including an inwardly curved groove 11 defined on a top of the seat post 10 and having multiple protrusions 111 successively formed on an inner wall of the inwardly curved groove 11 and in a tip tooth shape, and two troughs 12 defined on a free end of an outer wall of the inwardly curved groove 11;

a cushion 20 including a body 21 and a cap 22, wherein the body 21 has a curved holder 211 extending downward from a bottom of a center thereof and having an opening defined on a top of the curved holder 211, an arcuate abutting projection 212 extending from a bottom of the curved holder 211 with respect to the inwardly curved groove 11 of the seat post 10, multiple engagement portions 213 continuously arranged on an outer wall of the arcuate abutting projection 212, and two through holes 214 formed on the arcuate abutting projection 212 and corresponding to the two troughs 12 of the seat post 10, wherein the cap 22 is covered on the curved holder 211 of the body 21 so that the curved holder 211 has a hollow portion; and a locking unit 30 including two fixing elements 31 and two stepped nuts 32, wherein the two fixing elements 31 are inserted through the two troughs 12 of the seat post 10 and the two through holes 214 of the body 21 of the cushion 20, a first end of a respective fixing element 31 is adjustably received in a respective trough 12 of the seat post 10, and a second end of the respective fixing element 31 is accommodated in the hollow portion of the curved holder 211 of the body 21, wherein a respective stepped nut 32 is locked with the second end of the respective fixing element 31 away from the respective trough 12.

Figure 3:
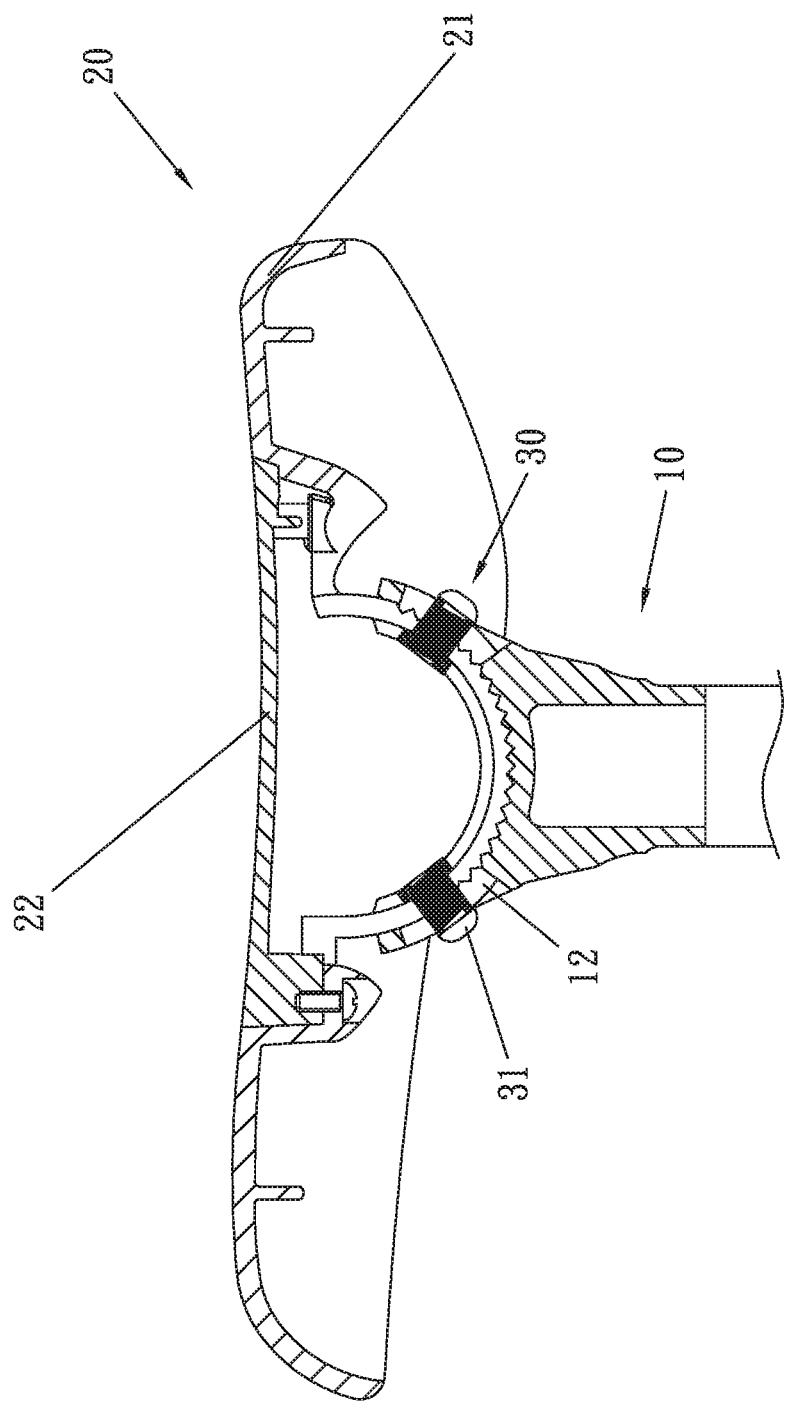
FIG. 3 is a cross sectional view showing the assembly of the angle adjustable bicycle saddle according to the preferred embodiment of the present invention.
Figure 4:
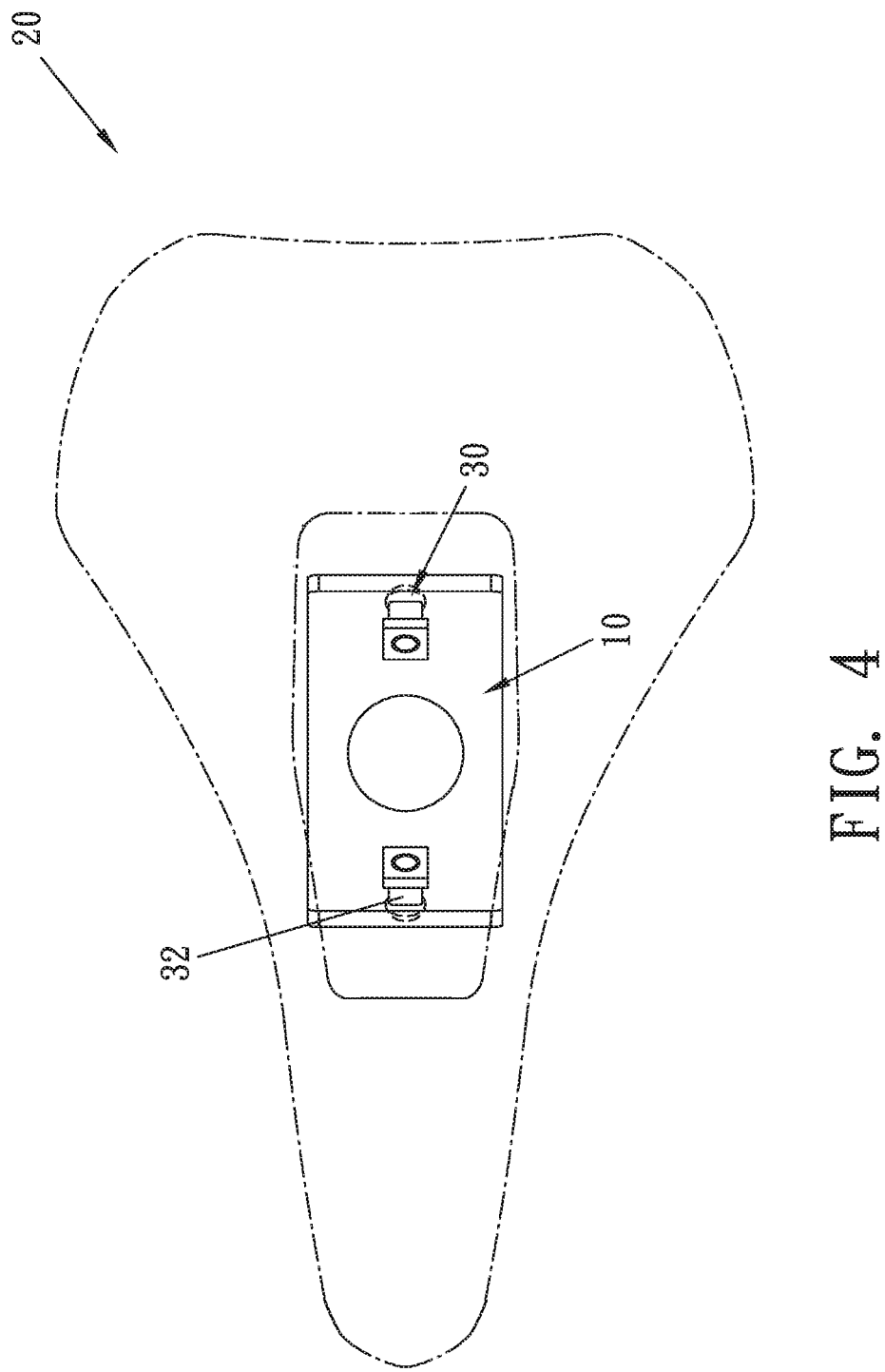
FIG. 4 is a bottom plan view showing the assembly of the angle adjustable bicycle saddle according to the preferred embodiment of the present invention.
Figure 5:
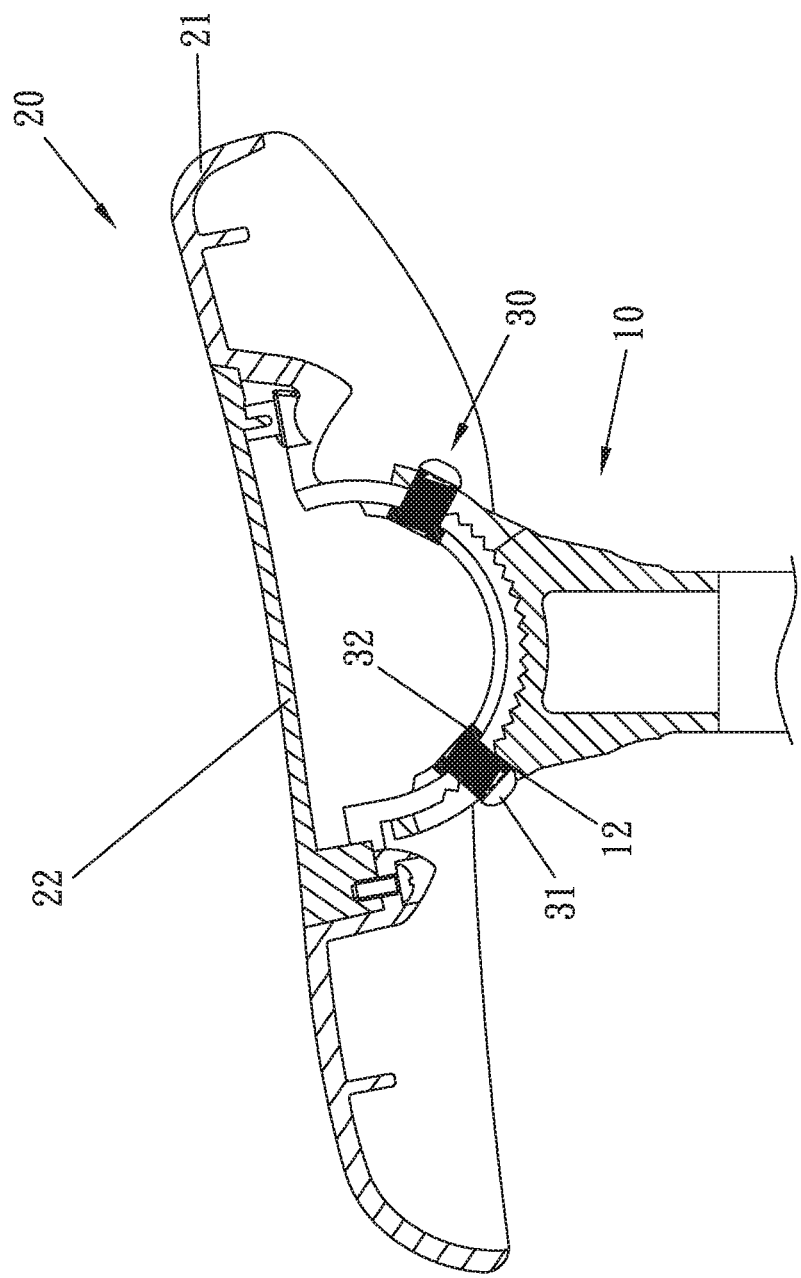
FIG. 5 is a cross sectional view showing the operation of the angle adjustable bicycle saddle according to the preferred embodiment of the present invention.
Figure 6:
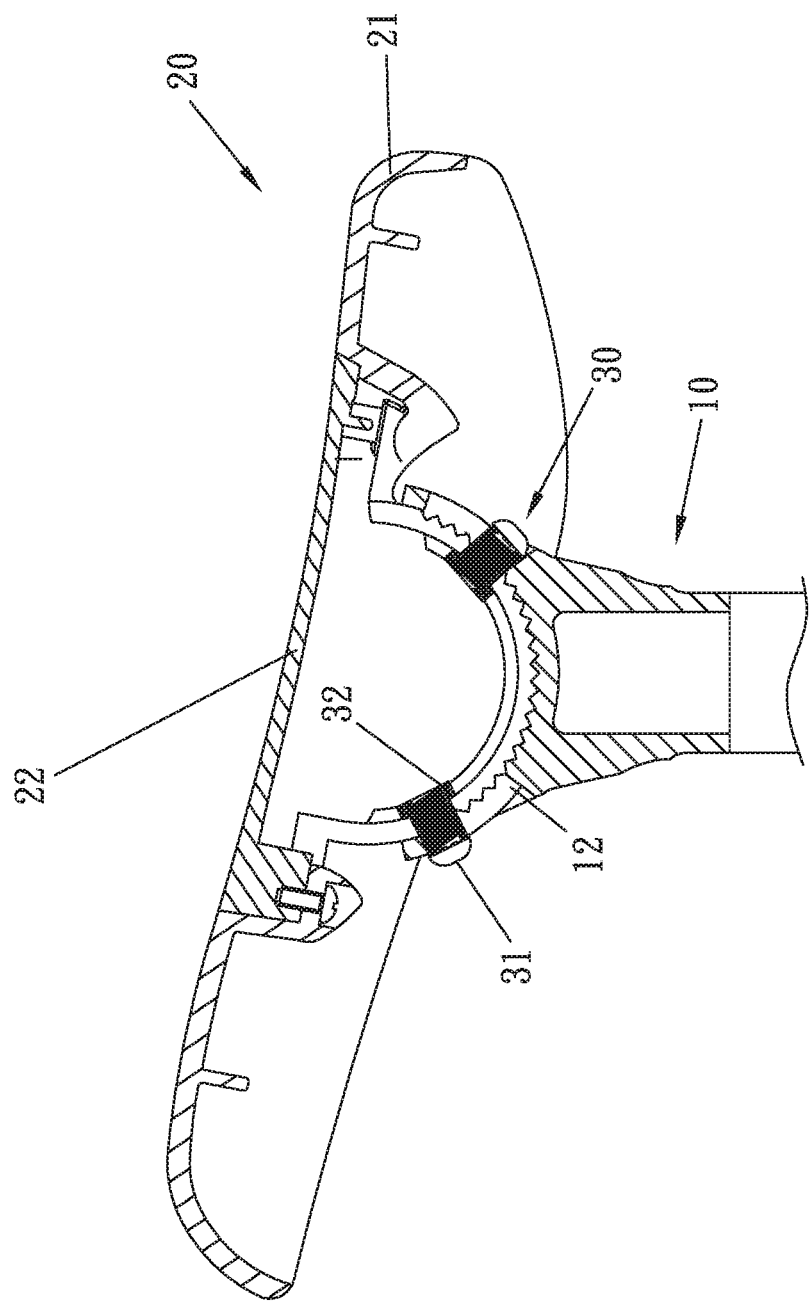
FIG. 6 is another cross sectional view showing the operation of the angle adjustable bicycle saddle according to the preferred embodiment of the present invention.

Referring to FIGS. 2-6, when adjusting the body 21, the two fixing elements 31 are manually rotated loosely by using a wrench so that the multiple protrusions 111 of the seat post 10 disengage from the multiple engagement portions 213 of the cushion 20, the two fixing elements 31 slide in the two troughs 12 of the seat post 10, and the body 21 is adjustably moved upward or downward to a desired angle by a user. As shown in FIG. 3, the body 21 is located at a horizontal angle when riding a bicycle. As illustrated in FIG. 5, the body 21 is moved downward and faces forward at a low horizontal angle. With reference to FIG. 6, the body 21 is moved upward and backward at a high horizontal angle. After adjusting the body 21 to the desired angle, the two fixing elements 31 are rotated tightly by using the wrench so that the multiple protrusions 111 of the seat post 10 engage with the multiple engagement portions 213 of the cushion 20, thus fixing the cushion 20 at the desired angle easily. Accordingly, the angle adjustable bicycle saddle is not broken, bent or removed when riding on a bumpy road by engaging the multiple protrusions 111 of the seat post 10 with the multiple engagement portions 213 of the cushion 20 and locking the seat post 10 with the cushion 20 by using the two stepped nuts 32 and the two fixing elements 31, thus obtaining security, angular adjustment, and safety.

Figure 7:
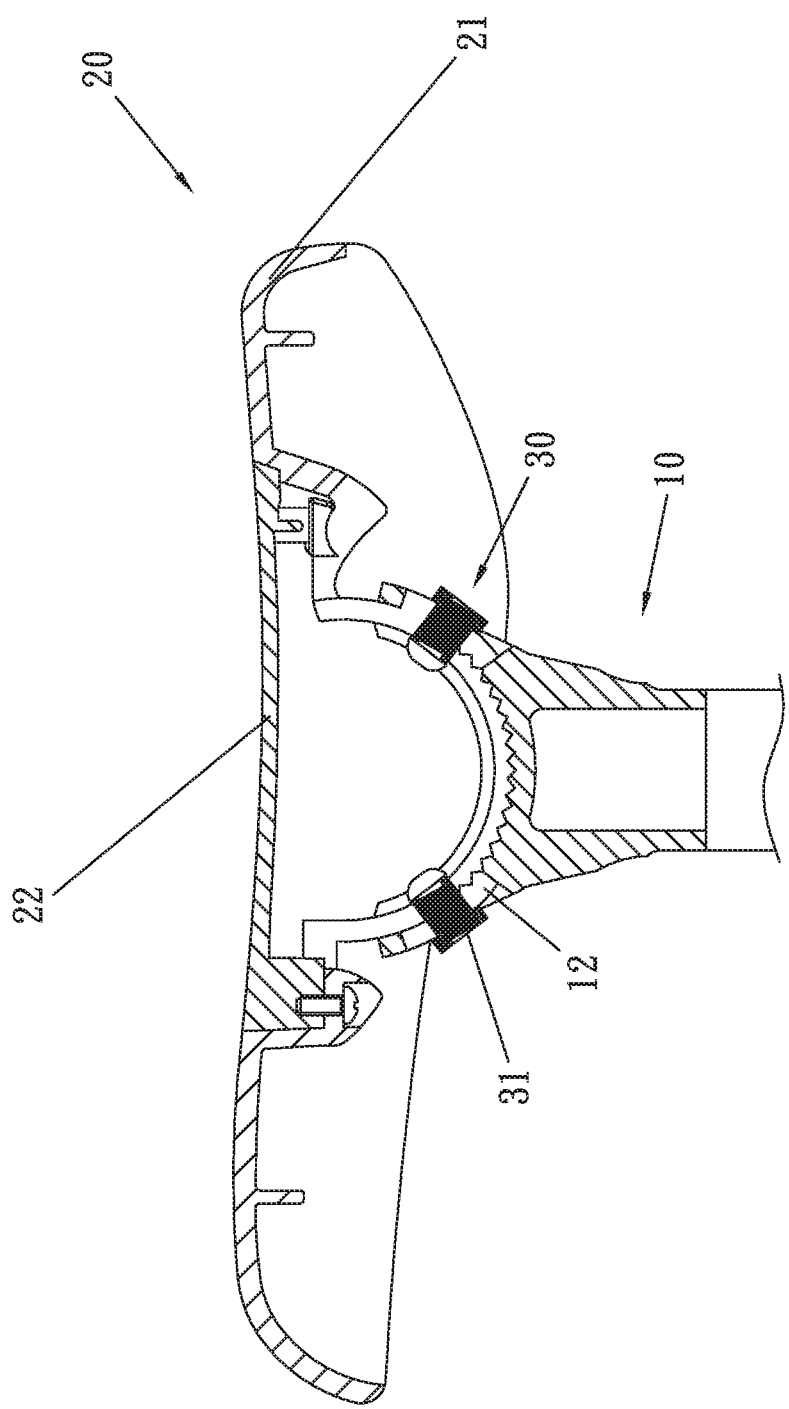
FIG. 7 is also another cross sectional view showing the operation of the angle adjustable bicycle saddle according to the preferred embodiment of the present invention.

With reference to FIG. 7, the respective fixing element 31 of the locking unit 30 is inserted through a respective through hole 214 of the body 21 of the cushion 20 and the respective trough 12 of the seat post 10, wherein the second end of the respective fixing element 31 is accommodated in the hollow portion of the curved holder 211 of the body 21, and the first end of the respective fixing element 31 is received in the respective trough 12 of the seat post 10, wherein the respective stepped nut 32 is locked with the first end of the respective fixing element 31 away from the respective through hole 214 of the body 21 of the cushion 20. When adjusting the body 21, the cap 22 is removed from the curved holder 211 of the body 21, the respective fixing element 31 is rotated loosely by way of the wrench so that the multiple protrusions 111 of the seat post 10 disengage from the multiple engagement portions 213 of the cushion 20, the respective stepped nut 32 slides in the respective trough 12 of the seat post 10, and the body 21 is adjustably moved upward or downward to the desired angle by the user. After adjusting the body 21 to the desired angle, the respective fixing element 31 is rotated tightly by using the wrench so that the multiple protrusions 111 of the seat post 10 engage with the multiple engagement portions 213 of the cushion 20, thus fixing the cushion at the desired angle easily. The cap 22 is covered on the curved holder 211 of the body 21 and the seat post 10 is locked with the cushion 20 by screwing the respective stepped nut 32 with the respective fixing element 31, thus enhancing security and avoiding fracture, bending, and removal, when riding on a bumpy road. Preferably, the angle adjustable bicycle saddle does not move or change its angle, thus enhancing safety.

Figure 8:
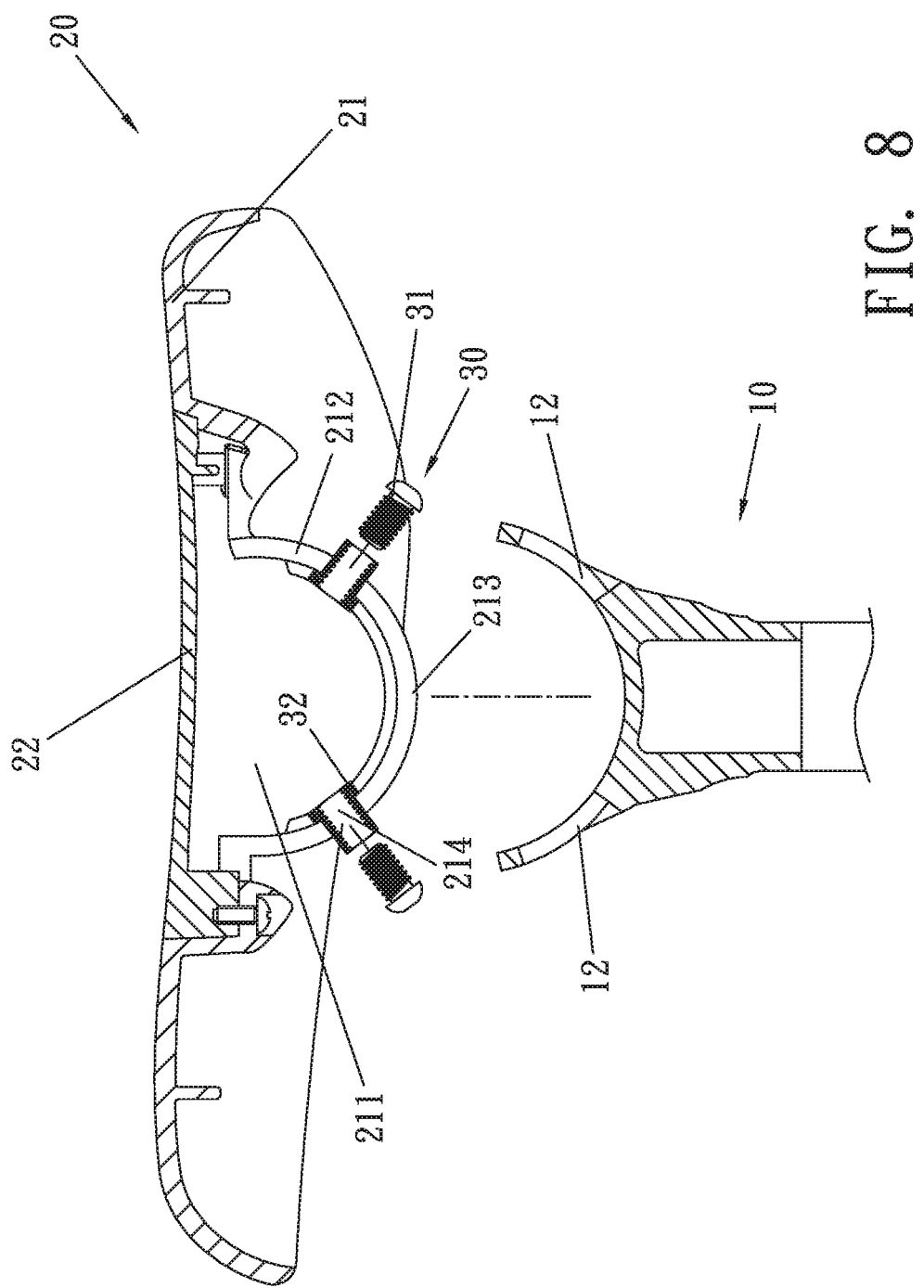
FIG. 8 is a cross sectional view showing the exploded components of an angle adjustable bicycle saddle according to another preferred embodiment of the present invention.
Figure 9:
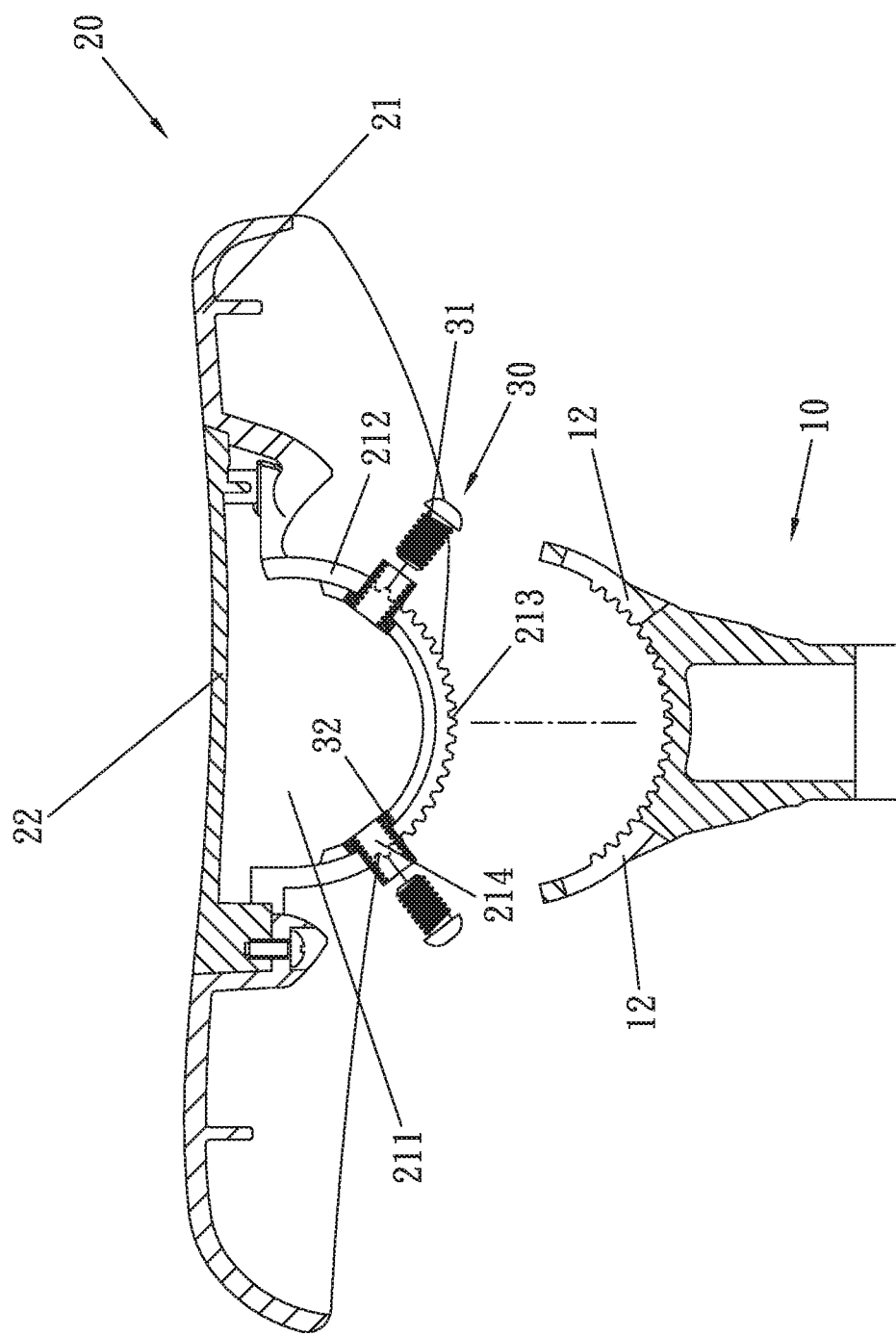
FIG. 9 is a cross sectional view showing the exploded components of an angle adjustable bicycle saddle according to another preferred embodiment of the present invention.

In another embodiment, as shown in FIG. 8, the multiple protrusions 111 of the inwardly curved groove 11 of the seat post 10 are a smooth plane, the multiple engagement portions 213 of the curved holder 211 of the body 21 are a smooth plane, and the seat post 10 is locked with the cushion 20 by screwing he respective stepped nut 32 with the respective fixing nut 31, thus obtaining the security. Referring to FIG. 9, in another embodiment, the multiple protrusions 111 of the inwardly curved groove 11 of the seat post 10 are a projected tooth, the multiple engagement portions 213 of the curved holder 211 of the body 21 are a projected tooth, such that the multiple protrusions 111 of the seat post 10 engage with the multiple engagement portions 213 of the cushion 20, and the seat post 10 is locked with the cushion 20 by screwing the respective stepped nut 32 with the respective fixing nut 31, thus enhancing the security.

Figure 10:
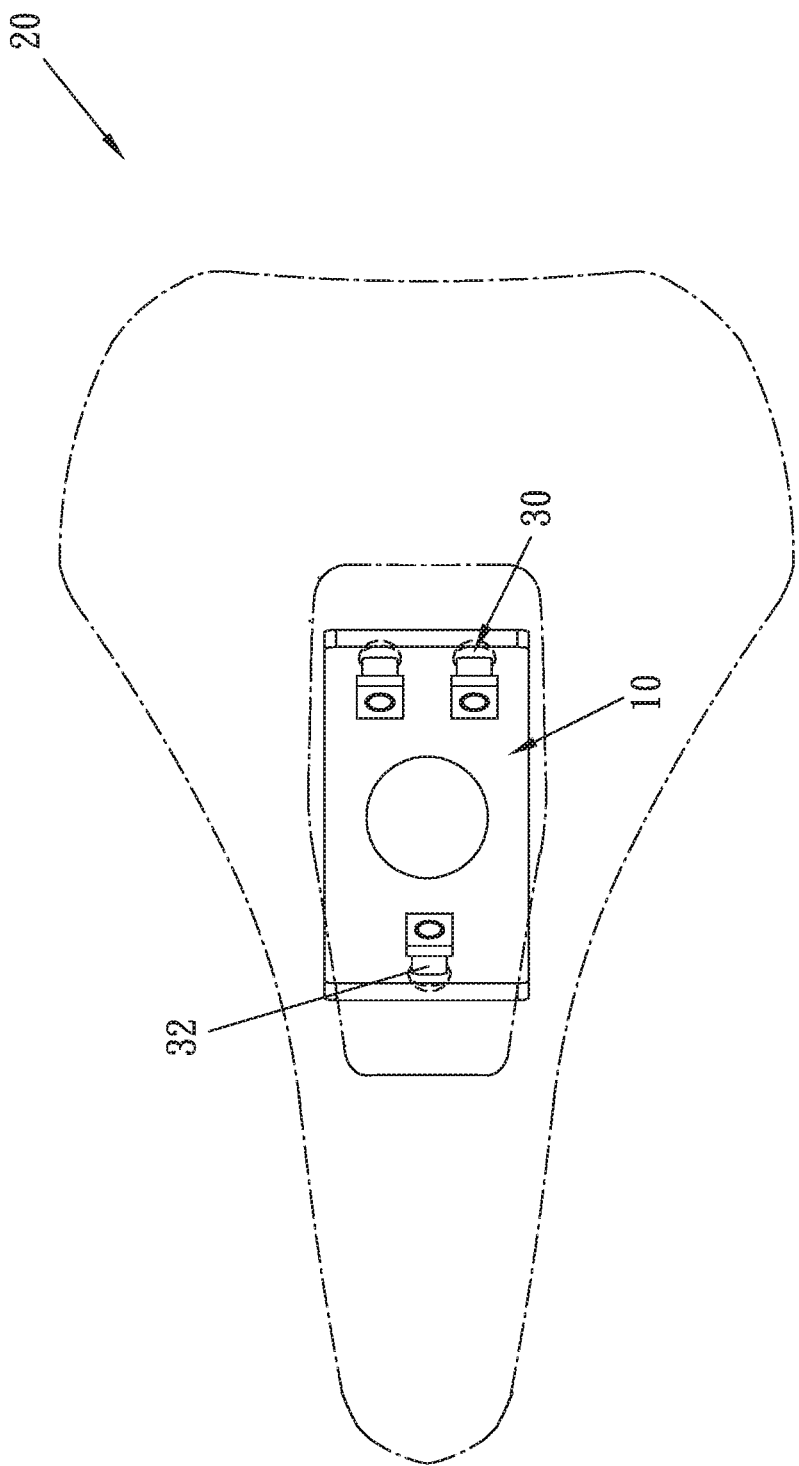
FIG. 10 is a top plan view showing the assembly of an angle adjustable bicycle saddle according to another preferred embodiment of the present invention.
Figure 11:
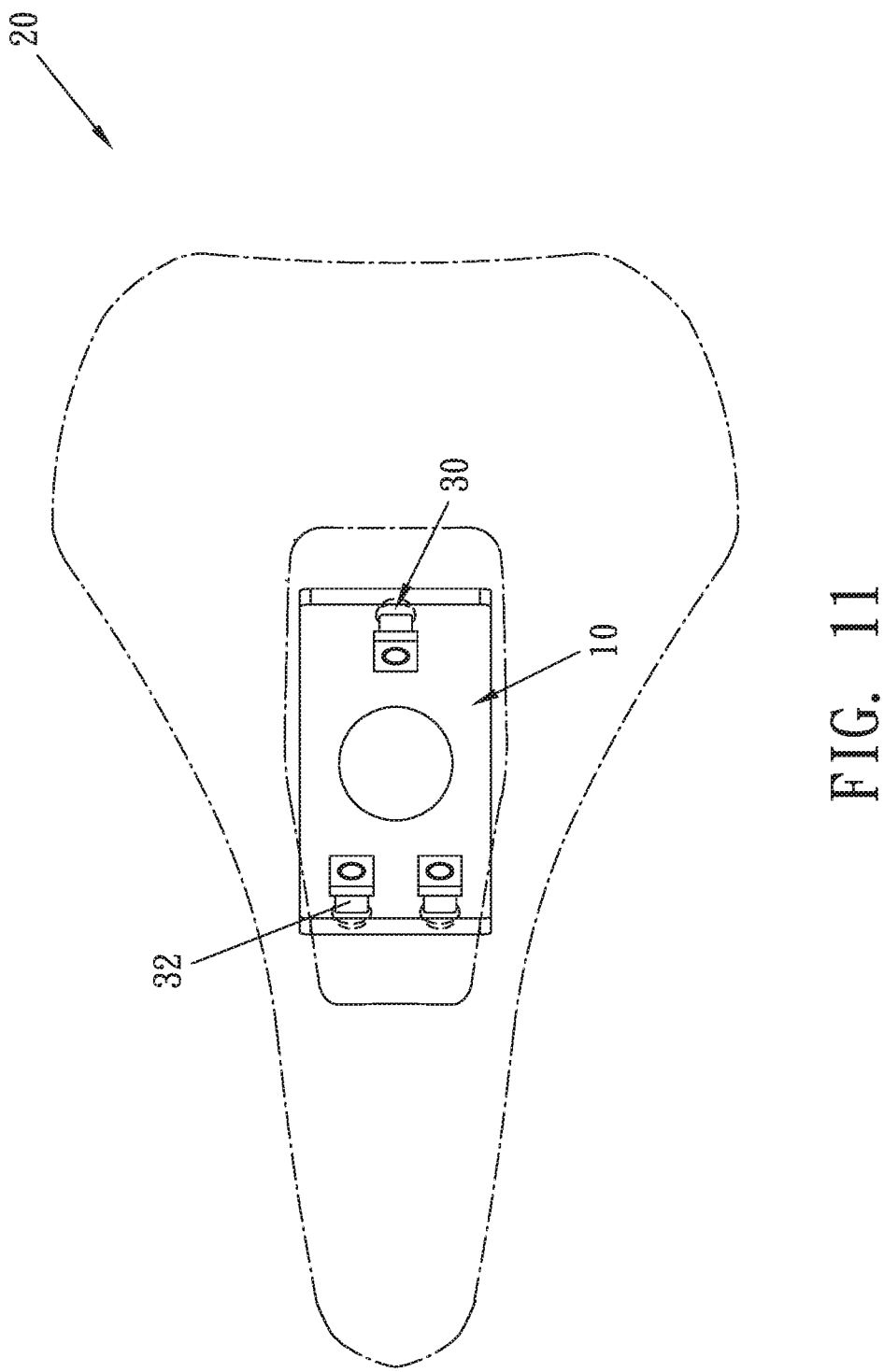
FIG. 11 is another top plan view showing the assembly of the angle adjustable bicycle saddle according to another preferred embodiment of the present invention.

In another embodiment, as shown in FIGS. 10 and 11, the seat post 10 includes the inwardly curved groove 11 formed on the top thereof, the inwardly curved groove 11 has three notches 12 defined on the free end thereof, and the arcuate abutting projection 212 has three through holes 214 formed thereon and corresponding to the three troughs 12 of the seat post 10.

While various embodiments in accordance with the present invention have been shown and described, it is clear to those skilled in the art that further embodiments may be made without departing from the scope of the present invention.

What is claimed is:

1. An angle adjustable bicycle saddle comprising:
a seat post including an inwardly curved groove defined on a top of the seat post and having multiple protrusions successively formed on an inner wall of the inwardly curved groove, and multiple troughs defined on a free end of an outer wall of the inwardly curved groove;
a cushion including a body and a cap, wherein the body has a curved holder extending downward from a bottom of a center thereof and having an opening defined on a top of the curved holder, an arcuate abutting projection extending from a bottom of the curved holder with respect to the inwardly curved groove of the seat post, multiple engagement portions continuously arranged on an outer wall of the arcuate abutting projection, and multiple through holes formed on the arcuate abutting projection and corresponding to the multiple troughs of the seat post, wherein the cap is covered on the curved holder of the body so that the curved holder has a hollow portion; and
a locking unit including multiple fixing elements and multiple stepped nuts, wherein each of the multiple stepped nuts extends through a corresponding through hole of the arcuate abutting projection, wherein a respective fixing element is inserted through a respective trough of the seat post and a respective through hole of the body of the cushion, wherein the multiple troughs are configured to allow the multiple fixing elements to slide therein, wherein a first end of a respective fixing element is adjustably received in the respective trough of the seat post, and a second end of the respective fixing element is accommodated in the hollow portion of the curved holder of the body, wherein a respective stepped nut is locked with the second end of the respective fixing element away from the respective trough.

2. The angle adjustable bicycle saddle as claimed in claim 1, wherein two troughs are defined on the seat post, and the locking unit includes two fixing elements and two stepped nuts, wherein each of the two fixing elements is inserted through a respective trough of the seat post and the respective through hole of the body of the cushion, the first end of the respective fixing element is adjustably received in the respective trough, and the second end of the respective fixing element is accommodated in the hollow portion of the curved holder of the body, wherein the respective stepped nut is locked with the second end of the respective fixing element away from the respective trough.

3. An angle adjustable bicycle saddle comprising:
a seat post including an inwardly curved groove defined on a top of the seat post and having multiple protrusions successively formed on an inner wall of the inwardly curved groove and in a tip tooth shape, and multiple troughs defined on a free end of an outer wall of the inwardly curved groove;
a cushion including a body and a cap, wherein the body has a curved holder extending downward from a bottom of a center thereof and having an opening defined on a top of the curved holder, an arcuate abutting projection extending from a bottom of the curved holder with respect to the inwardly curved groove of the seat post, multiple engagement portions continuously arranged on an outer wall of the arcuate abutting projection, and two through holes formed on the arcuate abutting projection and corresponding to the multiple troughs of the seat post, wherein the cap is covered on the curved holder of the body so that the curved holder has a hollow portion; and a locking unit including multiple fixing elements and multiple stepped nuts, wherein each of the multiple stepped nuts extends through a corresponding through hole of the arcuate abutting projection, wherein a respective fixing element is inserted through a respective through hole of the body of the cushion and a respective trough of the seat post, wherein the multiple troughs are configured to allow the multiple stepped nuts to slide therein, and, a first end of a respective fixing element is received in the hollow portion of the curved holder of the body, and a second end of the respective fixing element is accommodated in the respective trough of the seat post, wherein a respective stepped nut is locked with the second end of the respective fixing element away from the respective through hole of the body of the cushion.

\* \* \* \* \*